(12) United States Patent
Mosler

(10) Patent No.: US 7,270,340 B2
(45) Date of Patent: Sep. 18, 2007

(54) STRUT WITH AN ELASTIC WHEEL CARRIER MOUNT

(75) Inventor: Christian Mosler, Stuttgart (DE)

(73) Assignee: Daimler Chrysler AG, Stuttgart (DE)

( * ) Notice: Subject to any disclaimer, the term of this patent is extended or adjusted under 35 U.S.C. 154(b) by 140 days.

(21) Appl. No.: 11/274,948

(22) Filed: Nov. 15, 2005

(65) Prior Publication Data

US 2006/0082091 A1    Apr. 20, 2006

Related U.S. Application Data

(63) Continuation-in-part of application No. PCT/EP2004/003213, filed on Mar. 26, 2004.

(30) Foreign Application Priority Data

May 15, 2003    (DE) ................................ 103 21 878

(51) Int. Cl.
   *B62D 7/018*        (2006.01)
(52) U.S. Cl. .................. 280/93.512; 280/124.128; 280/124.148; 280/124.145
(58) Field of Classification Search ........... 280/93.512, 280/93.51, 124.128, 124.148, 124.145
   See application file for complete search history.

(56) References Cited

U.S. PATENT DOCUMENTS

| | | | | |
|---|---|---|---|---|
| 1,579,472 A | * | 4/1926 | Crost ..................... | 280/93.512 |
| 2,872,206 A | * | 2/1959 | Cislo .................... | 280/124.136 |
| 4,883,287 A | * | 11/1989 | Murakami et al. ..... | 280/124.135 |
| 5,205,580 A | * | 4/1993 | Luger et al. ............. | 280/86.75 |
| 5,219,176 A | * | 6/1993 | Mitchell ................ | 280/93.512 |
| 5,372,377 A | * | 12/1994 | Lee ...................... | 280/124.143 |
| 5,685,556 A | | 11/1997 | Shibue et al. | |
| 5,897,124 A | * | 4/1999 | Schaible et al. ....... | 280/124.146 |
| 6,099,003 A | * | 8/2000 | Olszewski et al. ..... | 280/93.512 |
| 6,241,262 B1 | * | 6/2001 | Suess ..................... | 280/5.522 |
| 6,398,241 B1 | * | 6/2002 | Mahnig et al. ......... | 280/93.512 |
| 6,454,252 B2 | * | 9/2002 | Miyamoto ............... | 267/219 |
| 6,966,702 B2 | * | 11/2005 | Phillips ...................... | 384/540 |
| 7,073,802 B2 | * | 7/2006 | McGaughy .............. | 280/93.51 |
| 7,159,316 B2 | * | 1/2007 | Sadanowicz et al. .. | 29/894.361 |
| 2004/0108674 A1 | * | 6/2004 | McGaughy ............. | 280/93.512 |
| 2004/0183270 A1 | * | 9/2004 | Tanke et al. ........... | 280/93.512 |
| 2005/0146111 A1 | * | 7/2005 | Yamazaki et al. .... | 280/124.135 |
| 2005/0200092 A1 | * | 9/2005 | Orimoto et al. ....... | 280/93.512 |
| 2006/0082094 A1 | * | 4/2006 | Mosler ................ | 280/124.116 |
| 2006/0290088 A1 | * | 12/2006 | Luttinen et al. ......... | 280/93.51 |

FOREIGN PATENT DOCUMENTS

| | | |
|---|---|---|
| DE | 198 32 384 | 11/1989 |
| FR | 2 726 227 | 5/1996 |
| JP | 63 270 209 | 11/1988 |
| JP | 04 287708 | 10/1992 |
| JP | 2000025438 | 1/2000 |
| JP | 2002012015 | 1/2002 |
| JP | 06 183233 | 7/2004 |
| WO | WO97/31794 | 9/1997 |

* cited by examiner

*Primary Examiner*—Paul N. Dickson
*Assistant Examiner*—Timothy D. Wilhelm
(74) *Attorney, Agent, or Firm*—Klaus J. Bach

(57) ABSTRACT

In an independent wheel suspension including a wheel-guiding strut which is mounted on a vehicle body, a wheel carrier is so supported on the strut by several elastic pivoting bearings, that a high degree of driving comfort is provided by a controlled accommodation of lateral, longitudinal and vertical forces.

7 Claims, 7 Drawing Sheets

STRUT WITH AN ELASTIC WHEEL CARRIER MOUNT

This is a Continuation-In-Part Application of International application PCT/EP2004/003213 filed Mar. 26, 2004 and claiming the priority of German Application 103 21 878.5 filed May 15, 2003.

BACKGROUND OF THE INVENTION

The invention relates to a independent wheel suspension in the form of an inclined, longitudinal or composite wheel-guiding strut which is mounted on a vehicle body and comprises a wheel carrier mounted on the strut by several elastic pivot bearings.

Such an independent wheel suspension is known from DE 198 32 384 C1. It comprises a wheel carrier which is pivotable approximately about a vertical axis, the pivoting axis of the wheel carrier lying behind the wheel axle in relation to the direction of travel, while the wheel carrier is supported elastically on the inclined, longitudinal or composite strut in the vehicle transverse direction in front of the wheel axle. As the pivoting bearing arrangement is brought about by a dimensionally stable four-bar linkage, the wheel suspension is prone to longitudinal vibrations, which affect the driving comfort, especially in connection with active brake control systems.

It is therefore the object of the present invention to provide an independent wheel suspension with a separately elastically mounted wheel carrier providing for a high degree of driving comfort even when lateral, longitudinal and vertical forces are effective on the vehicle wheels.

SUMMARY OF THE INVENTION

In an independent wheel suspension including a wheel-guiding strut which is mounted on a vehicle body, a wheel carrier is so supported on the strut by several elastic pivoting bearings that a high degree of driving comfort is provided by a controlled accommodation of lateral, longitudinal and vertical forces.

To this end, the elastic pivoting bearings consist at least in regions of two concentric rings or a ring and a bolt, between which an elastomer body is at least in regions non-detachably disposed. The outer ring like the inner ring does not necessarily have to be round or cylindrical. The wheel carrier has—in front of the wheel rotational axis in the direction of vehicle travel—at least one elastic control bearing, the bearing journal of which lies with its center line in a vertical plane which encloses an angle of 20° to 50° with the direction of travel. It is mounted movably on the strut—behind the wheel rotation axis with respect to in the direction of travel—and above the horizontal wheel center transverse plane via at least one swivel support link articulated in pivoting bearings, the center lines of the pivoting bearings lying in an at least approximately vertical plane. The wheel carrier is mounted movably on the strut—behind the wheel rotational axis with respect to the direction of travel—and below the horizontal wheel center transverse plane via a support bearing in the form of a pivot bearing. The center line of this pivot bearing extends at least approximately parallel to the longitudinal axis of the vehicle.

Such a wheel carrier bearing arrangement has a low distortion in any direction. All the pivoting bearings are mounted positively in their main loading directions, that is, in form-locking arrangements.

The invention will become more readily apparent from the description of diagrammatically illustrated embodiments.

DESCRIPTION OF PREFERRED EMBODIMENTS

Figure 1:
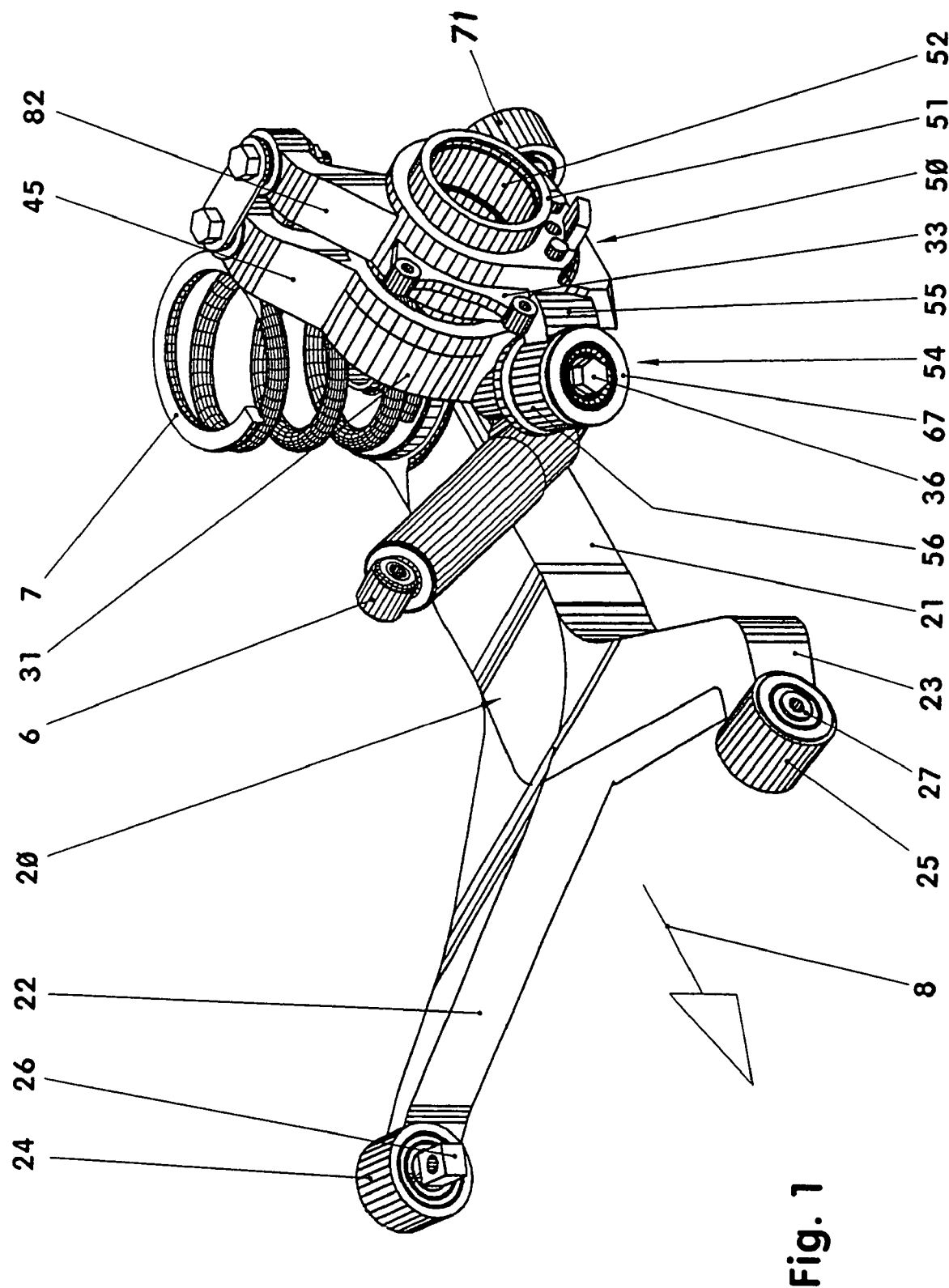
FIG. 1 is a single wheel suspension in a diametric illustration.
Figure 2:
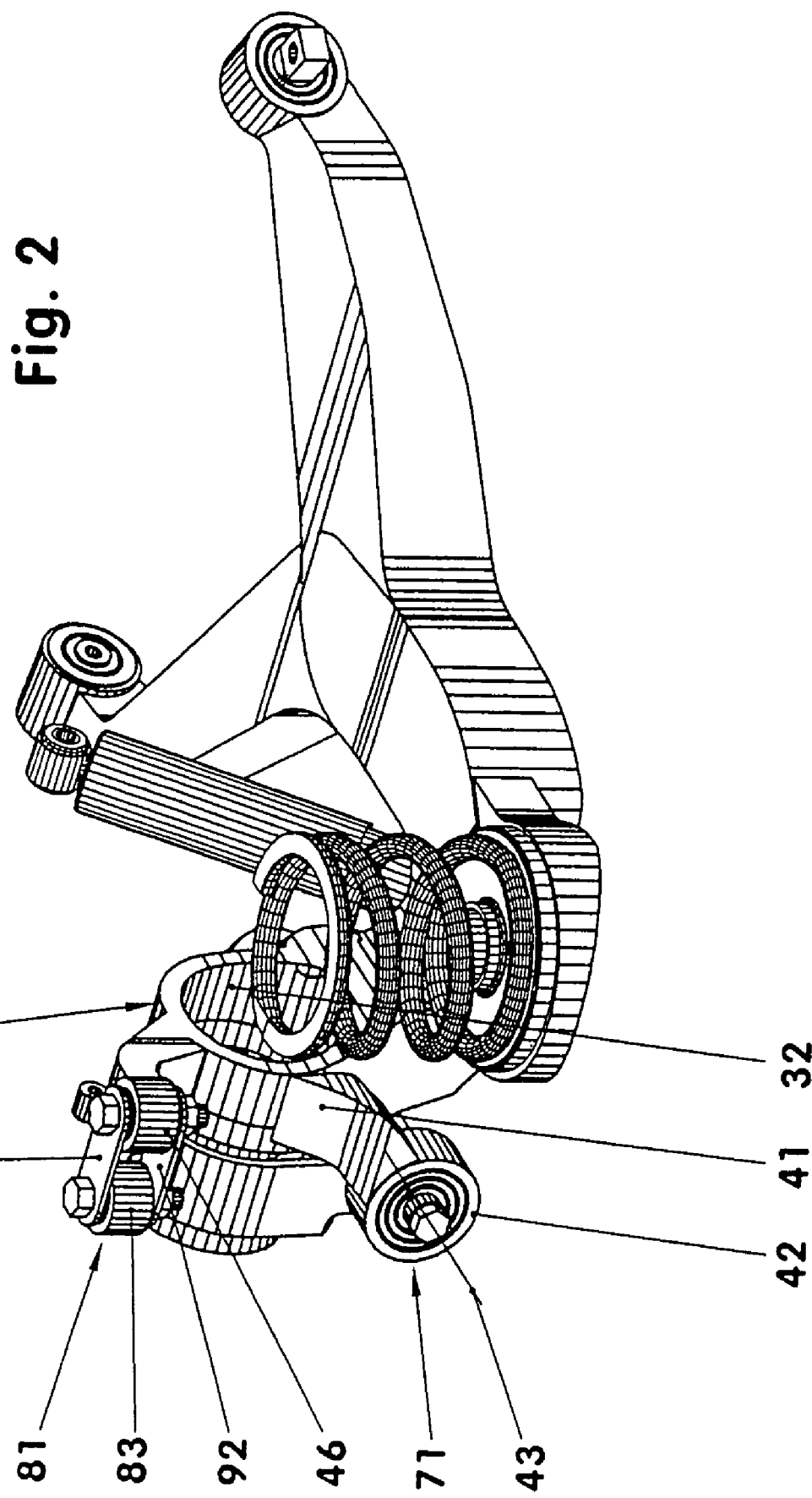
FIG. 2 shows the arrangement of FIG. 1, rotated by-about 180°.

The independent wheel suspension illustrated in FIGS. 1-7 shows a wheel carrier (50) mounted elastically on an inclined strut (20), by way of example.

In the illustrative embodiment, the inclined strut (20) comprises a longitudinal-strut-like central part (21) which forks into two strut arms (22, 23) in the direction of vehicle travel (8). In this connection, the strut arm (22) is oriented toward the vehicle center, while the other (23) ends in the region in front of the wheel (1), cf. FIG. 3. Strut bushes (24, 25) are in each case arranged at the two free ends of the strut arms (22, 23). A bolt (26) is mounted elastically in the strut bush (24), while the strut bush (25) comprises an elastically mounted sleeve (27). According to FIG. 4, the geometric center of the strut bush (24) lies higher than the geometric center of the bearing bush (25). At the same time, the strut bush (24) lies closer to the wheel rotation axis (2) in relation to the strut bush (25), cf. FIG. 3. The elastomer bodies of the pivoting bearings (24, 25) of the inclined strut (20) are longitudinally and transversely stiff rubber bearings, for example.

The central part (21) is angled off toward the vehicle outside in the region of the wheel rotation axis (2). A wheel carrier bearing body (31) is formed on its angled-off end. This body has essentially the shape of a short tube, the bore center line of which lies on, or is at least located in direct proximity to, the wheel rotation axis (2). The upper contour of the central part (21) lies below the lowest point of the central bore (32) of the wheel carrier bearing body (31).

The wheel carrier (50) is mounted elastically on the wheel carrier bearing body (31) in three places. These places are the control bearing (54), the support bearing (71) and the swivel support bearing arrangement (81). According to FIG. 4, the control bearing (54) lies in front of the vertical (4), and below the horizontal, wheel center transverse plane (3). The support bearing (71) is located behind the vertical wheel center transverse plane (3) and, with regard to the height level, below the control bearing (54), for example. The swivel bearing arrangement (81) lies virtually directly above the support bearing (71) and above the horizontal wheel center transverse plane (3).

Figure 3:
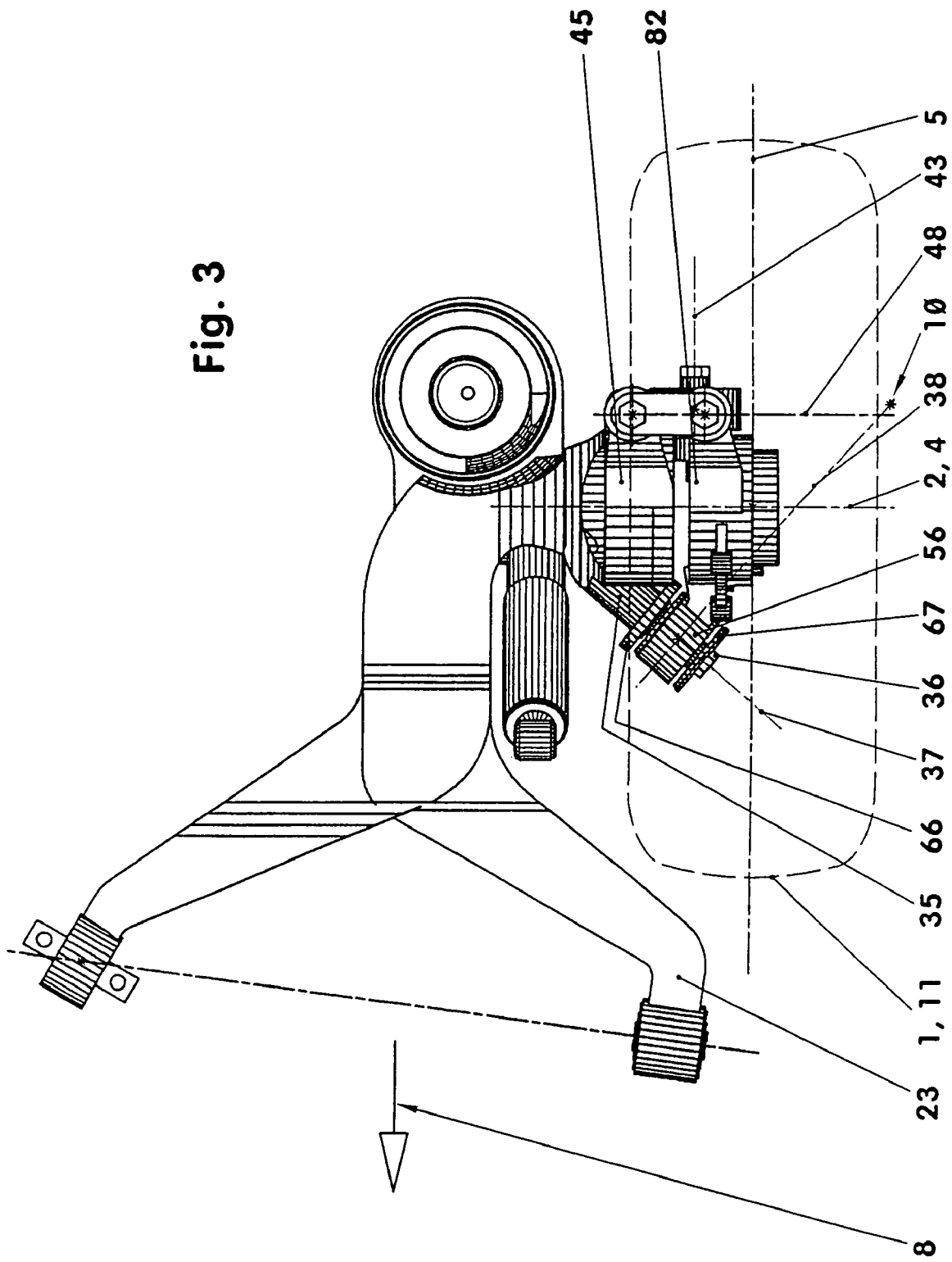
FIG. 3 is a top view of the independent wheel suspension.

A forwardly projecting control bearing journal (35) is located in the region of the transition from the central part (21) to the wheel carrier bearing body (31). It extends parallel to the roadway surface (9) and encloses an angle of 20° to 50° with the direction of travel (8). In FIG. 3, the angle is 49 angular degrees, for example. The center line

(37) of the control bearing journal (35) lies roughly 8.5% of the wheel diameter below the horizontal wheel center transverse plane (3), for example. The tire outside diameter sketched in broken lines in FIGS. 3, 4, 5 and 7 is designated as the wheel diameter here. The center line (37) intersects the vertical wheel center transverse plane (4) at a distance of 30% of the wheel diameter behind the wheel center longitudinal plane (5).

A for example offset support bearing cantilever arm (41) is arranged on the rear side of the wheel carrier bearing body (31). This arm ends in a support bearing eye (42). The center line (43) of the support bearing eye (42) is shifted inward from the wheel center longitudinal plane (5) by roughly 8% of the wheel diameter. It lies roughly 15% of the wheel diameter below the horizontal wheel center transverse plane (3). The center point of the support bearing eye (42) is located shifted backward behind the vertical wheel center transverse plane (4) by 13.5% of the wheel diameter, for example.

A for example offset swivel cantilever arm (45) is arranged in the upper region of the wheel carrier bearing body (31). It has at its free end a swivel bearing eye (46) with, for example, a center line (47) oriented perpendicularly to the roadway surface (9). According to FIG. 4, this line lies in a plane (48) which is parallel to the vertical wheel center transverse plane (4) and in which the center point of the support bearing eye (42) also lies. The center line (47) of the inner swivel bearing eye (46), cf. FIG. 5, is arranged shifted inward from the wheel center longitudinal plane (5) by roughly 16% of the wheel diameter. The center of the swivel bearing eye (46) on the strut side is located displaced above the horizontal wheel center transverse plane (3) by 17% of the wheel diameter, for example.

Figure 4:
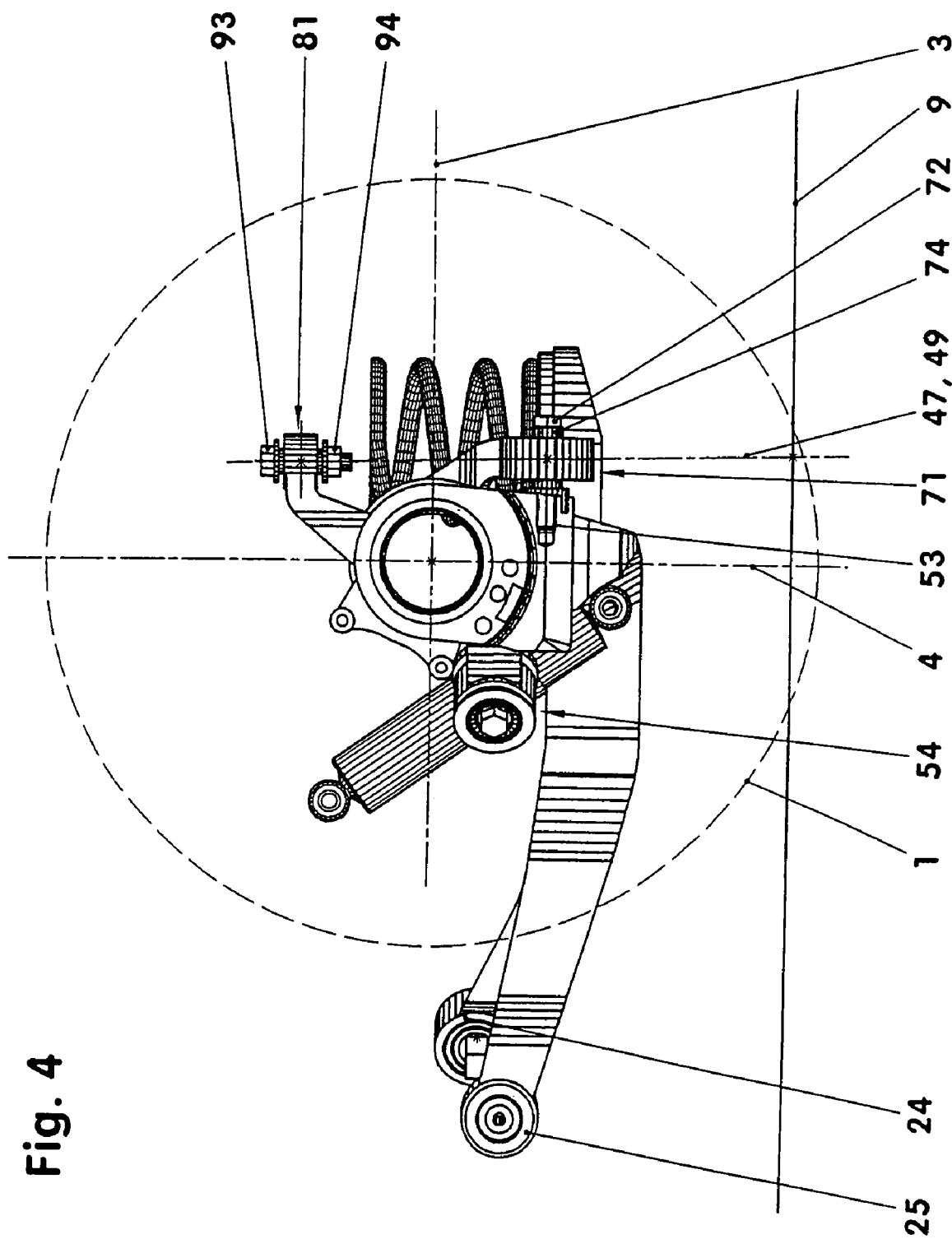
FIG. 4 is a side view of FIG. 1.
Figure 5:
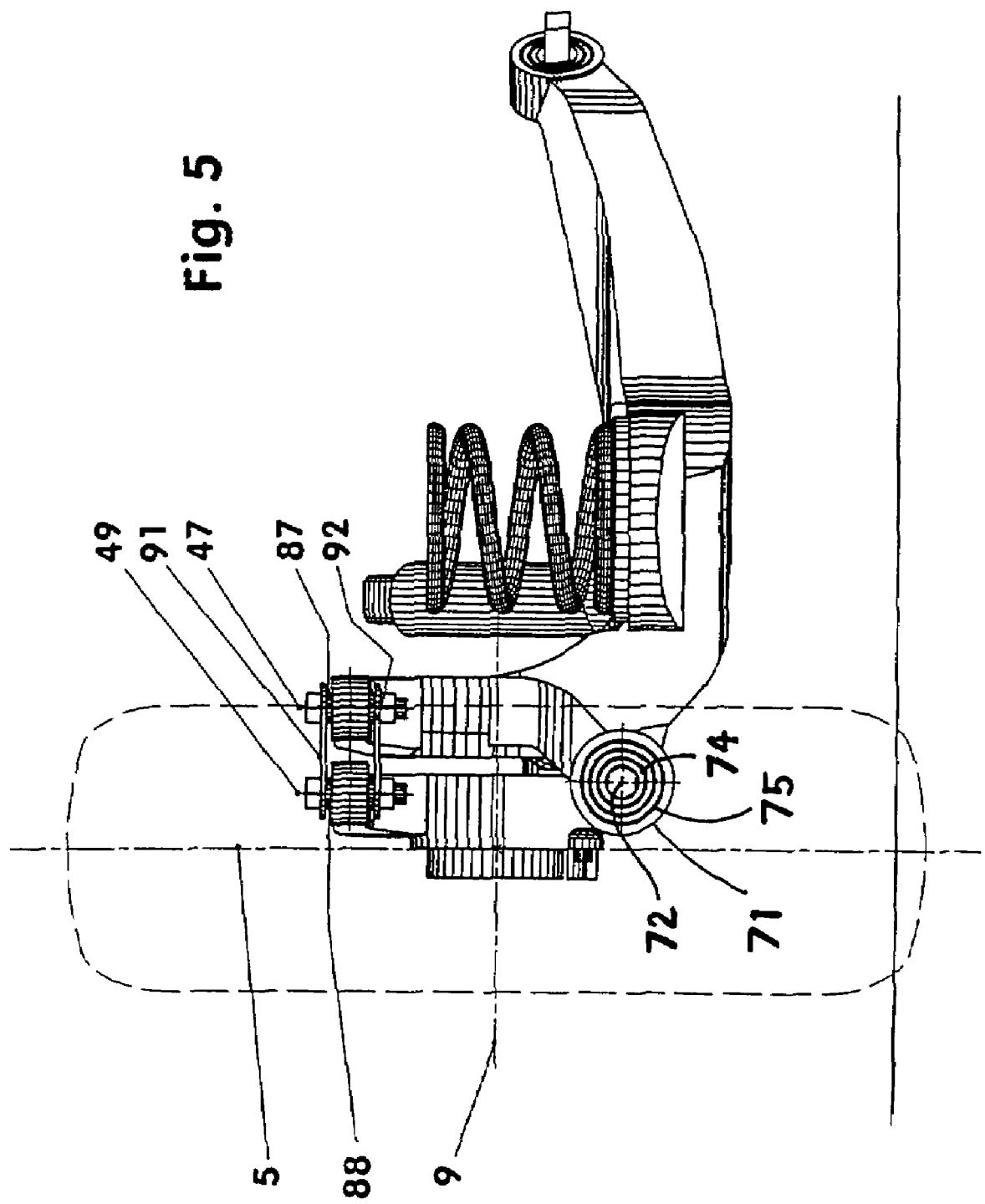
FIG. 5 is a rear view of FIG. 1.

The central part (21) of the strut (20) is extended backward beyond the vertical wheel center transverse plane (4) counter to the direction of travel (8), cf. FIGS. 3 and 4. In this zone, a spring element (7) oriented for example perpendicularly to the roadway surface (9) is supported on the strut (20). A shock absorber (6) is mounted on the strut (20) in an articulated manner in front of the vertical wheel center transverse plane (4) and below the horizontal wheel center transverse plane (3). The shock absorber (6), which is shifted inward by for example 29% of the wheel diameter in relation to the wheel center longitudinal plane (5), is inclined forward by roughly 45° in relation to the vertical.

The wheel carrier (50) is an essentially tubular component which is, shifted outward, mounted elastically on the wheel carrier bearing body (31). In the installation position, it lies virtually congruently in front of the wheel carrier bearing body (31). The central bore (52) of the wheel carrier (50) is aligned with the bore (32), for example. The distance between the at least approximately parallel-displaced wheel carrier (50) and the wheel carrier bearing body (31) is roughly 2% of the wheel diameter. The wheel carrier (50) comprises a hub (51), a control bearing cantilever arm (55) with a control bearing eye (56) and an outer swivel cantilever arm (82) with a swivel bearing eye (83).

The for example offset control bearing cantilever arm (55) projects in the direction toward the control bearing journal (35) in such a way that the center line of the control bearing eye (56) is aligned with the center line (37) of the control bearing journal (35). The geometric center of the control bearing eye (56) is in this connection located for example roughly 18% of the wheel diameter away from the vertical wheel center transverse plane (4). An elastomer body (61) with for example a metal inner bush (60), received by the control bearing eye (56) is arranged on the control bearing journal (35), cf. FIG. 6. The elastomer body (61) of the control bearing (54) is designed to be stiff in the vertical direction. In the horizontal directions, the longitudinal stiffness and transverse stiffness are matched to a given roll steer effect. The control bearing consequently brings about transverse, longitudinal and vertical support.

Axial bearing disks (66, 67) are arranged as mechanical stops on both sides of the elastomer body (61) and the control bearing eye (56), cf. FIG. 3.

The outer swivel cantilever arm (82) extends from the hub (51) in the rear upper region of the hub (51). It is virtually congruent in front of the inner swivel cantilever arm (45), cf. FIGS. 1, 4. As shown in FIG. 4, the center line (49) and the geometric center of the swivel bearing eye (83) on the wheel carrier side also coincide with the center line (47) and the center of the swivel bearing eye (46) on the strut side. Elastomer bodies (85, 86) with integrated inner bushes (87, 88), for example, are vulcanized in the two swivel bearing eyes (46, 83) (see FIG. 2). The inner bushes (87, 88) (FIG. 5) project upward and downward a few millimeters beyond the length of the swivel bearing eyes (46, 83) measured along the center lines (47, 49). The swivel support links (91) and (92), which support the wheel carrier (50) on the inclined strut (20) in the transverse direction, bear against the upper and lower end sides of the inner bushes (87, 88). The swivel support links (91, 92) each have two bores, the center lines of which coincide with the center lines (47, 49). Via a bolt/nut connection (93, 94) in each case, the left inner bush (88) and the right inner bush (87) are according to FIG. 5 screwed together with the swivel links (91, 92) to form a rigid assembly. The swivel link supports (91, 92) are in this connection aligned parallel to the roadway surface (9) in the construction position.

The swivel support bearing arrangement (81) is designed to be very stiff in the transverse direction, while it is flexible in the longitudinal and vertical directions.

According to FIGS. 4, 5, a threaded bore (53) extending parallel to the roadway surface (9) is located in the hub (51) below the outer swivel bearing eye (83). An elastomer body (75) with an inner bush (74) is fastened in this bore by means of a screw (72). The elastomer body (75), which has no radial stiffness differences for example, is part of the support bearing eye (42). It is stiff in the transverse and vertical directions but designed to be soft in the longitudinal direction or direction of travel (8).

Instead of the screw (72), a threaded pin can protrude from the hub (51), on which the elastomer body (75), or the inner bush (74), is fastened.

According to FIG. 3, when braking and lateral forces occur, the instantaneous center of rotation (10) of the independent wheel suspension lies on the roadway surface (9) on the outside of the vehicle outside the contact area roughly 18.5% of the wheel diameter away from the wheel center longitudinal plane (5). It lies shifted backward from the vertical wheel center transverse plane (4) by an amount which corresponds to roughly 14% of the wheel diameter.

In sum, the wheel carrier (50) is mounted on the strut (20) behind the wheel center in such a way that it is longitudinally very resilient so as to promote driving comfort but with a high degree of vertical and transverse stiffness. As a result, the control bearing (54) is influenced only slightly in its action by the support bearing (71) and the swivel support bearing arrangement (81).

According to FIG. 4, during braking, a torque acts counterclockwise on the wheel carrier (50), to which the brake calliper is fastened on the brake anchor plate flange (33). The support bearing (71) moves backward counter to the direction of travel (8), while the outer swivel link eye (83) moves forward in relation to the inner swivel link eye (46). In this connection, the wheel carrier (50) tips toward the wheel carrier bearing body (31), increasing the negative camber, in the upper region. At the same time, the control bearing eye (56) moves in the direction of the spring element (7), cf. FIG. 3. In this connection, the wheel (1) moves into a toe-in position.

During cornering, when the wheel (1) illustrated in FIG. 3 is on the outside of the bend, the lateral forces bring about under-steering behavior. The wheel (1) pivots about the instantaneous center of rotation (10) into toe-in. This makes elastic guidance of the control bearing eye (56) along the center line (37) of the control bearing journal (35) possible. Owing to this elastic flexibility and the high transverse stiffness of the swivel support bearing arrangement (81) and also that of the support bearing (71), only the front region of the wheel carrier (50) moves toward the strut (20). By virtue of the inclination of the center line (37) according to FIG. 3, the wheel carrier (50) moves back in relation to the wheel carrier bearing body (31) under lateral force influence. Consequently, the swivel support bearing arrangement (81) pivots counterclockwise in such a way, in a top view, that the swivel bearing eye (82) is moved backward. The longitudinal shift is greater here than in the case of the support bearing (71). The plane (48) pivots backward out of the vertical position, by virtue of which the intersection of the plane (48) with the displaced normal plane (38) forms a straight line which represents a displaced center of rotation (10) on the roadway surface (9). The center of rotation (10) has moved forward in relation to the wheel center. The spring deflection of the strut (20) is superimposed on this movement. The pivoting movement of the strut (20), an inclined or longitudinal strut for example, displaces the center of rotation (10) backward counter to the direction of travel (8). The forward movement described above largely balances the backward movement.

Figure 6:
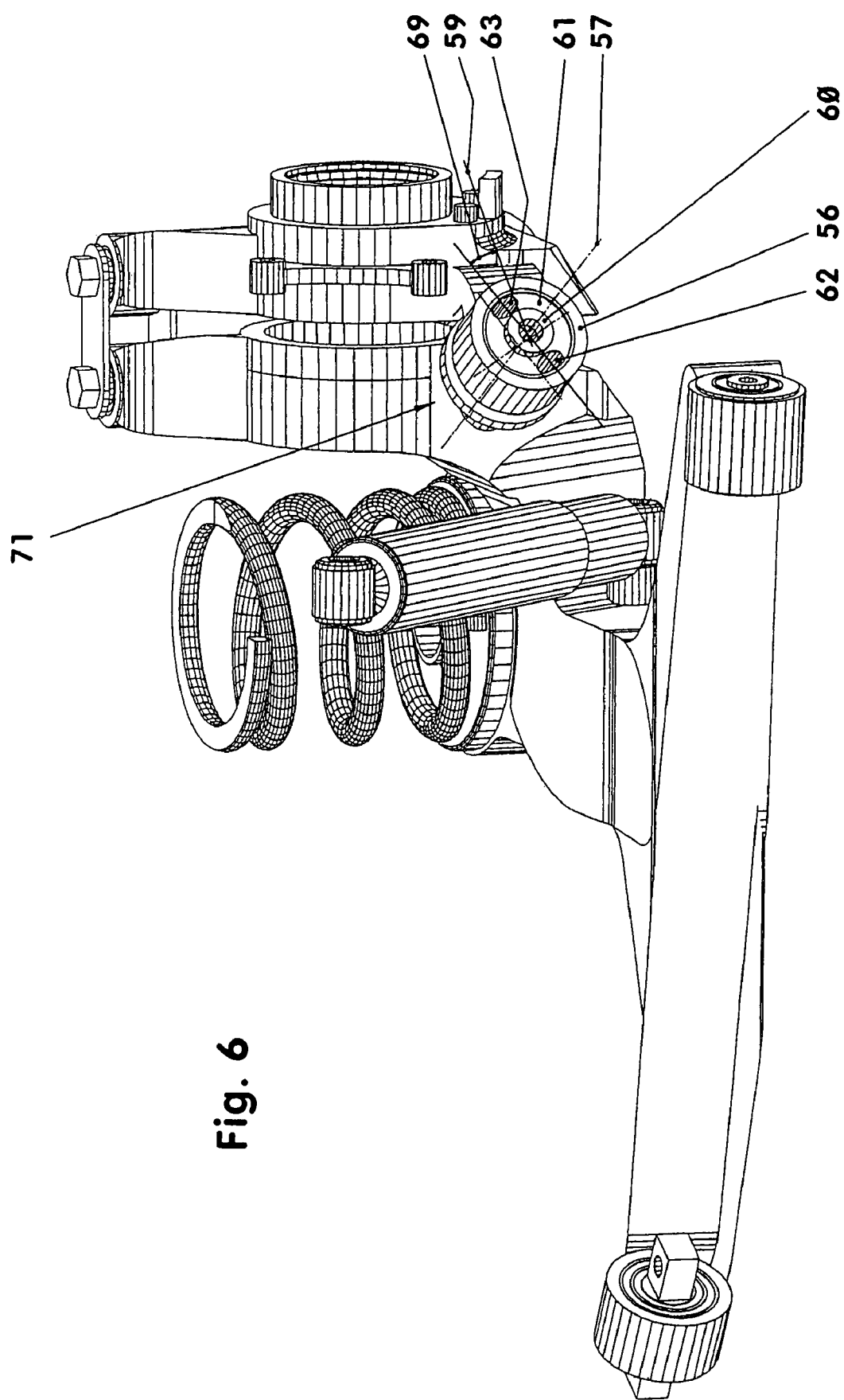
FIG. 6 is a perspective view of the independent single wheel suspension from the front.

FIG. 6 illustrates inter alia a support bearing (71), the screw (36), cf. FIG. 1, and outer axial disk (67) of which have been removed. The elastomer body (61), with the cutouts (62, 63), located on the inner bush (60) is clearly visible. The cutouts (62, 63) run parallel to the center line (57), for example. They have an elliptical cross section, for example, and are pivoted in relation to a datum plane (68) defined by the center line (57) and a horizontal normal (60) to this center line (57) by the angle (69), so that the front cutout (62) lies below and the rear cutout (63) above the plane. The angle (69) comprises 30 to 45 angular degrees. The cutouts (62, 63) bring about additional longitudinal elasticity in the control bearing (54), which reinforces the pivoting into toe-in during braking.

If appropriate, the cutouts (62, 63) are arranged in such a way that the rear cutout (63) lies below the datum plane and the front cutout (62) above it. In this case also, the angular range can be 30 to 45 angular degrees.

Figure 7:
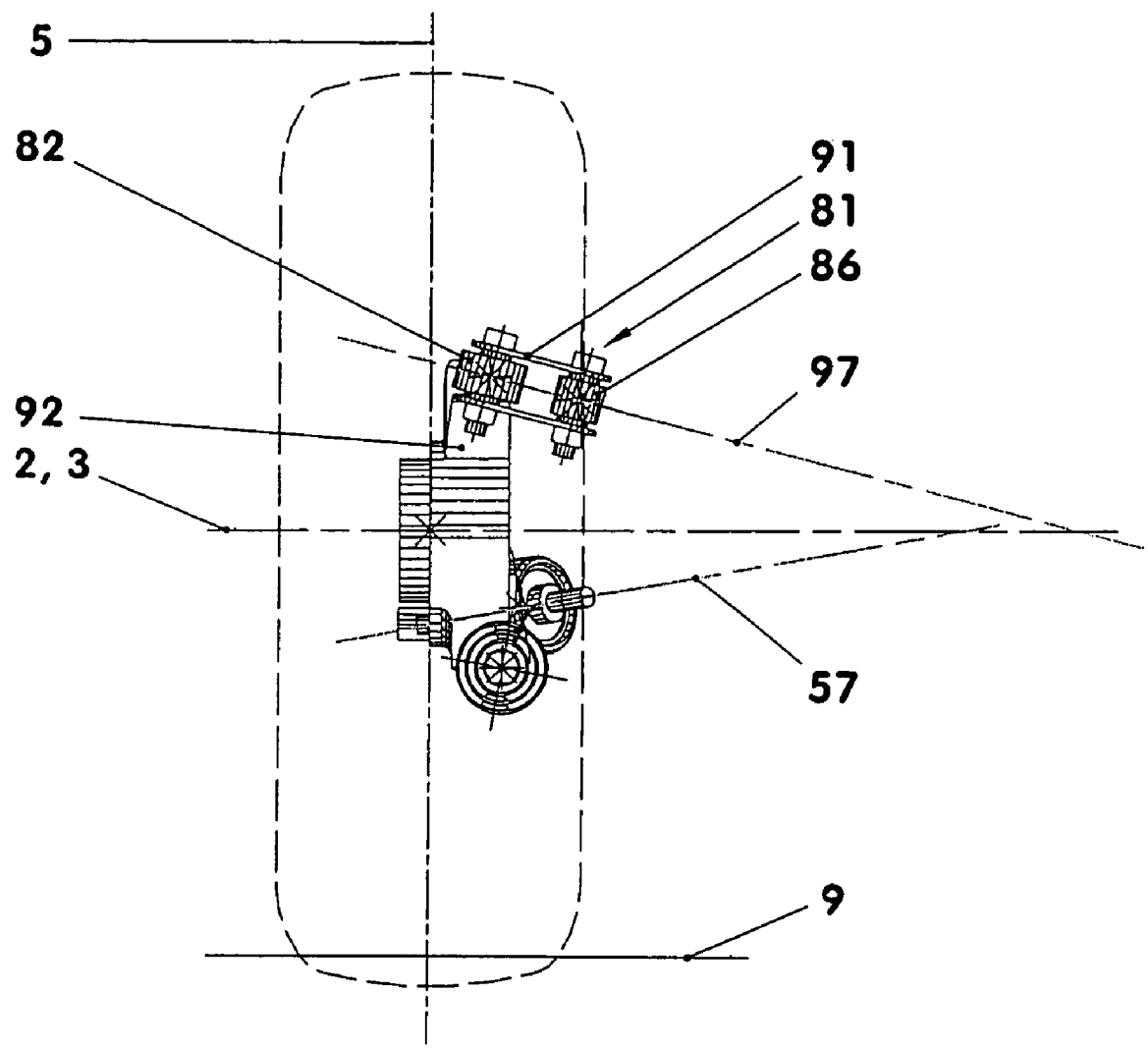
FIG. 7 shows the independent single wheel suspension in a rear view with inclined swivel support structure.

As an alternative to the variant shown in FIGS. 1-5, a wheel carrier (50) which is equipped with a strut (not illustrated) via swivel support links (91, 92) extending at an angle is shown in FIG. 7. The geometric centers of the swivel bearing eyes (82) and of the elastomer bodies (86) lie on an action line (97) which encloses an angle of 15 angular degrees, for example, with the horizontal wheel center transverse plane (3). The intersection point of the action line (97) is shifted toward the vehicle center. It has a distance of 70% of the wheel diameter in relation to the wheel center longitudinal axis (5).

Furthermore, the center line (57) of the control bearing (54) is inclined toward the horizontal wheel center transverse plane (3). The angle of inclination lies in a range of 20±10 angular degrees. The center line (57) intersects the horizontal wheel center transverse plane (3) between the wheels of an axle. The distance between the intersection point and the wheel center longitudinal plane (5) is roughly 58% of the wheel diameter.

The support bearing (71) is also provided with approximately horizontal cutouts which reduce the vertical stiffness of the bearing. The two cutouts lie in the vertical plane in which the center line (43) is arranged. The angle of the direction of the greatest radial bearing stiffness of the support bearing (71) measures in relation to the horizontal wheel center transverse plane (3) roughly half the angle which lies between the horizontal wheel center transverse plane (3) and the action line (97) of the swivel support links (91, 92). In this connection, the upper cutout of the support bearing (71) is shifted slightly toward the vehicle center, for example, while the lower cutout of the support bearing (73) is displaced toward the vehicle outside by a corresponding shift.

By virtue of the two inclinations of the action lines (57, 97), largely braking-neutral driving behavior is achieved. During braking, the wheel carrier (50) moves outward—along the center line (57)—at the front under the braking torque and inward at the rear owing to the swivel support link movement. This toe-out effect compensates the going into toe-in under the effect of the longitudinal delay forces. The wheel carrier reacts in a braking-neutral way. This improves the driving behavior especially in the case of active brake control systems.

During engine braking, the going into a toe-in position of the wheels is fully maintained, since twisting of the wheel carrier (50) about the wheel rotational axis (2) does not occur as no braking torque is applied to the wheel carrier. Over-steering caused by load changes is consequently considerably reduced.

In the event of an additional vertical wheel load, the wheel carrier bearing body (31) moves downward without roll steering, although the wheel carrier (50) moves slightly inward at the front. The inwardly sloping swivel support bearing arrangement (81) balances this change in wheel toe at the level of the roadway and additionally brings about or increases a negative camber when spring deflection takes place.

With this wheel carrier design, the full longitudinal flexibility of the wheel carrier bearing arrangement is consequently maintained in the case of all forces acting counter to the direction of travel (8), that is, during braking as well. Braking vibrations are consequently largely isolated.

What is claimed is:

1. An independent wheel suspension with a wheel-guiding strut (20) which is mounted on a vehicle body and comprises a wheel carrier (50) mounted on the strut (20) by several elastic pivot bearings, the wheel carrier (50) having a center axis and being attached to the strut (20) in front of its center axis (2) with regard to the direction of travel (8) via at least one elastic control bearing (54) having a bearing journal (35) with a center line (37) which is disposed in a vertical plane extending at an angle of 20° to 50° with respect to the direction of travel (8), the wheel carrier (50) further being mounted movably on the strut (20) behind the axis (2) thereof with respect to the direction of travel (8) and above the horizontal wheel center transverse plane (3) via at least one swivel support link (91) articulated in pivot bearings (46, 87) and (83, 88) having axial center lines (47, 49) disposed in an at least approximately vertical plane at least in the installation position, and the wheel carrier (50) being also movably supported on the strut (20) behind the axis (2) thereof with respect to the direction of travel (8) and below the horizontal wheel center transverse plane (3) via a support bearing (71) in the form of a pivoting bearing having a center line (43) extending at least approximately parallel to the direction of vehicle travel (8).

2. The independent wheel suspension as claimed in claim 1, including a swivel support bearing arrangement (81) having pivoting bearings with center lines (47, 49) so as to support the swivel support links (91, 92) in a plane (48) which is oriented perpendicularly to the center line (43) of the support bearing (71).

3. The independent wheel suspension as claimed in claim 2, wherein the plane (48) encloses an angle of from 90° to 110° with the direction of vehicle travel (8).

4. The independent wheel suspension as claimed in claim 2, wherein a plane (38) normal to the center line (57) of the control bearing journal (35) and disposed in the geometric center of the control bearing eye intersects a plane (48) in a straight line which intersects a roadway surface (9) behind the wheel rotation axis (2) and outside the wheel contour (11) on the wheel side facing away from the vehicle.

5. The independent wheel suspension as claimed in claim 2, wherein the swivel support bearing arrangement (81) consists of two swivel support links (91, 92) restrained between two inner bushes (87, 88).

6. The independent wheel suspension as claimed in claim 1, wherein the swivel support bearing arrangement (81) includes swivel bearing eyes (46, 83) which are in each case arranged on upwardly projecting cantilever arms (45, 82), the pivoting bearing centers lying above the horizontal wheel center transverse plane (3) by at least a fifth of the wheel diameter.

7. The independent wheel suspension as claimed in claim 1, wherein the bearing journal (35) of the control bearing (54) is part of the strut (20).

* * * * *